(12) United States Patent
Chen

(10) Patent No.: US 6,199,953 B1
(45) Date of Patent: Mar. 13, 2001

(54) SECTOR RECLINER WITH SINGLE POSITION MEMORY

(75) Inventor: Song Chen, Troy, MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 0 days.

(21) Appl. No.: 09/313,888

(22) Filed: May 18, 1999

(51) Int. Cl.[7] ................................................. B60N 2/02
(52) U.S. Cl. ................. 297/367; 297/378.12; 297/372
(58) Field of Search ........................... 297/367, 378.12, 297/372

(56) References Cited

U.S. PATENT DOCUMENTS

| | | |
|---|---|---|
| 3,736,025 | 5/1973 | Ziegler et al. . |
| 3,957,312 | 5/1976 | Bonnaud . |
| 4,065,178 | 12/1977 | Carella et al. . |
| 4,502,730 | 3/1985 | Kazaoka et al. . |
| 4,579,386 | 4/1986 | Rupp et al. . |
| 4,660,886 | 4/1987 | Terada et al. . |
| 4,762,366 | 8/1988 | Bauer et al. . |
| 4,925,228 | 5/1990 | Pipon et al. . |
| 5,269,588 | 12/1993 | Kunz et al. . |
| 5,280,999 | 1/1994 | Jones et al. . |
| 5,390,981 | 2/1995 | Griswold . |
| 5,393,123 | 2/1995 | Hernandez et al. . |
| 5,433,507 * | 7/1995 | Chang .................. 297/367 |
| 5,522,643 | 6/1996 | Matsuura . |
| 5,660,440 | 8/1997 | Pejathaya . |
| 5,707,112 | 1/1998 | Zinn . |
| 5,749,625 | 5/1998 | Robinson . |
| 5,769,493 | 6/1998 | Pejathaya . |
| 5,788,330 | 8/1998 | Ryan . |
| 5,813,725 | 9/1998 | Robinson . |
| 5,823,622 | 10/1998 | Fisher, IV et al. . |
| 5,918,939 | 7/1999 | Magadanz . |

* cited by examiner

*Primary Examiner*—Laurie K. Cranmer
(74) *Attorney, Agent, or Firm*—Harness, Dickey & Pierce, P.L.C.

(57) ABSTRACT

A seat hinge assembly for a vehicle seat having a single position memory feature that permits the seatback to be returned and latched in a predetermined "design" position after having been folded into a memory actuating position. The seat hinge assembly includes a lower hinge member adapted to be secured to the seat bottom, and upper hinge member adapted to be fixed to the seat back, a latching mechanism operable in the latch mode for securing the upper hinge member in a fixed position relative to the lower hinge member and an unlatched mode for releasing the upper hinge member for movement relative to the lower hinge member, and a memory mechanism operable in a non-actuated mode and an actuated mode. The upper hinge member is coupled to the lower hinge member for pivotal movement relative thereto between a forward dumped position and a fully reclined position. In its non-actuated mode, the memory mechanism permits independent actuation of the latching mechanism while in its actuated mode the memory mechanism maintains the latching mechanism in its unlatched mode. The memory mechanism includes a blocker coupled to the lower hinge member for movement between a blocking position and a retracted position, an actuator coupled to move with the upper hinge member and operatively engage the blocker to move the blocker into the blocking position when the upper hinge member is moved into a memory actuating position forward of the adjustment range and to move the blocker into the retracted position upon movement of the upper hinge member from the memory actuating position to a predetermined design position.

24 Claims, 4 Drawing Sheets

SECTOR RECLINER WITH SINGLE POSITION MEMORY

BACKGROUND OF THE INVENTION

1. Field of the Invention

The present invention relates generally to seats for motor vehicles and, more particularly, to a sector recliner assembly having an easy entry memory feature for use with vehicle seats.

2. Description of Background Art

Virtually all motor vehicles are now equipped with front seat assemblies having a recliner mechanism that can be selectively actuated by the seat occupant for adjusting the angular position of the seatback relative to the seat bottom between an upright position and a fully-reclined position. In most two-door vehicles, the front seat assemblies also include a dump mechanism which can be actuated for pivoting the seatback to a forward dumped position to provide greater access to the rear seating area of the vehicle passenger compartment.

In many instances, recliner mechanisms have been modified to include a memory feature that is actuated in response to movement of the seatback to its dumped position. Many of these memory mechanisms automatically place the seatback in either a fully upright position or to the previous reclined position following return of the seatback from its dumped position. While a variety of such memory dump mechanisms are currently available, most are relatively complex and expensive. Thus, a continuing need exists to develop alternative dump mechanisms which provide the memory feature in an arrangement that is simple in construction, reliable, and less expensive to produce.

SUMMARY OF THE INVENTION

Accordingly, it is an object of the invention to provide a seat hinge assembly for a vehicle seat that is operable to permit selective reclining and dumping movement of the seatback and which has a single position memory feature for returning the seatback to a predetermined design position after a dumping operation has been performed.

It is a further object of the present invention to provide a seat recliner mechanism with a single position memory device that is reliable as well as simple and inexpensive to manufacture.

It is still another object of the present invention to provide a hinge assembly with a pawl and sector latching mechanism and a single position memory feature.

According to a preferred construction, the seat hinge assembly of the present invention is adapted for use with a seat assembly having a seatback supported for pivotal movement relative to a seat bottom. The seat hinge assembly includes a lower hinge member adapted to be secured to the seat bottom and an upper hinge member adapted to be fixed to the seatback. The upper hinge member is coupled to the lower hinge member for pivotal movement relative thereto between a forward dumped position and a fully reclined position. The seat hinge assembly also includes a latching mechanism operable in a latched mode for securing the upper hinge member in a fixed position relative to the lower hinge member and to retain the seatback in a reclined position within an adjustment range. The latching mechanism is further operable in an unlatched mode for releasing the upper hinge member from movement relative to the lower hinge member. The seat hinge assembly further includes a memory mechanism operable in a non-actuated mode for permitting independent actuation of the latching mechanism and in an actuated mode for maintaining the latching mechanism in the unlatched mode. The memory mechanism includes a blocker coupled to the lower hinge member for movement between a blocking position and a retracted position. An actuating pin is coupled to move with the upper hinge member and operatably engages the blocker to pivot the blocker into the blocking position when the upper hinge member is moved forward of the adjustment range and to pivot the blocker into the retracted position upon movement of the upper hinge member from the forward dumped position to a predetermined design position.

Further areas of applicability of the present invention will become apparent from the detailed description provided hereinafter. However, it should be understood that the detailed description and specific examples, while indicating a preferred embodiment of the invention, are provided for purposes of illustration only, since various changes and modifications within the spirit and scope of the invention will become apparent to those skilled in the art from this detailed description.

DETAILED DESCRIPTION OF THE DRAWINGS

The present invention will become more fully understood from the detailed description given here below and the accompanying drawings wherein:

FIG. 3 is a left-side plan view of the seat hinge assembly shown in FIG. 1 coupled to a vehicle seat and with the upper hinge member in a full forward position within the predetermined adjustment range;

DETAILED DESCRIPTION OF THE PREFERRED EMBODIMENTS

Figure 1:
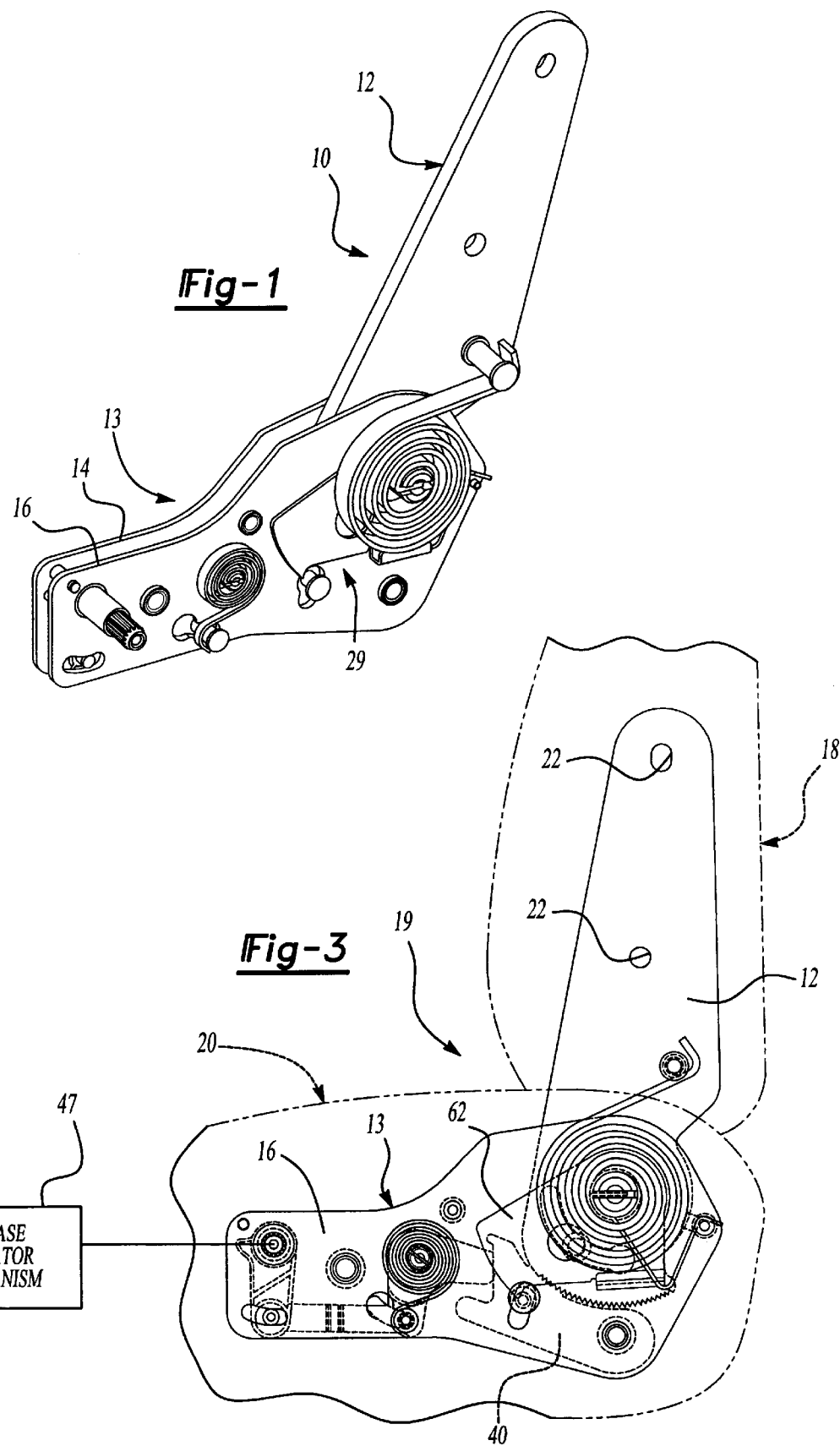
FIG. 1 is a perspective view of the seat hinge assembly of the present invention.

The present invention relates to a seat hinge assembly 10 adapted for incorporation into a vehicle seat 19 having an upholstered seat back 18 and a seat bottom 20. Vehicle seat 19 is of a type contemplated for use as the front seat in a passenger-type motor vehicle. For example, vehicle seat 19 can be used with a traditional separate restraint system or of the "all-belts-two seat" type (i.e., stand-alone structural seat). Seat hinge assembly 10 is preferably located along the outboard lateral side of vehicle seat 19 to permit convenient actuation of its reclining and dumping features.

Seat hinge assembly 10 includes an upper hinge member 12 pivotably coupled to a lower hinge member 13 that includes inner and outer seat plates 14 and 16, respectively. As best illustrated in FIG. 3 upper hinge member 12 is connectable to a seatback 18 of vehicle seat 19 and inner and outer seat plates 14 and 16 are connectable to a seat bottom 20 such that pivotable movement of the recliner plate corresponds to reclining movement of the seatback relative to the seat bottom. More specifically, upper hinge member 12 includes apertures 22 for connecting the upper hinge member to the seatback of the vehicle seat and spacer barrels 24 (FIG. 2) disposable within apertures 26 in inner and outer seat plates 14 and 16 for connecting the plates to the frame of the vehicle seat bottom. A pivot pin 50 couples upper hinge member 12 to inner and outer seat plates 14 and 16 for pivotable movement relative thereto. A recliner coil spring 52 having a first end coupled to pivot pin 50 and a second end engaged with a power spring pin 54 fixed to upper hinge member 12 creates a biasing force that urges the upper hinge member to pivot in a forward direction.

Figure 4:
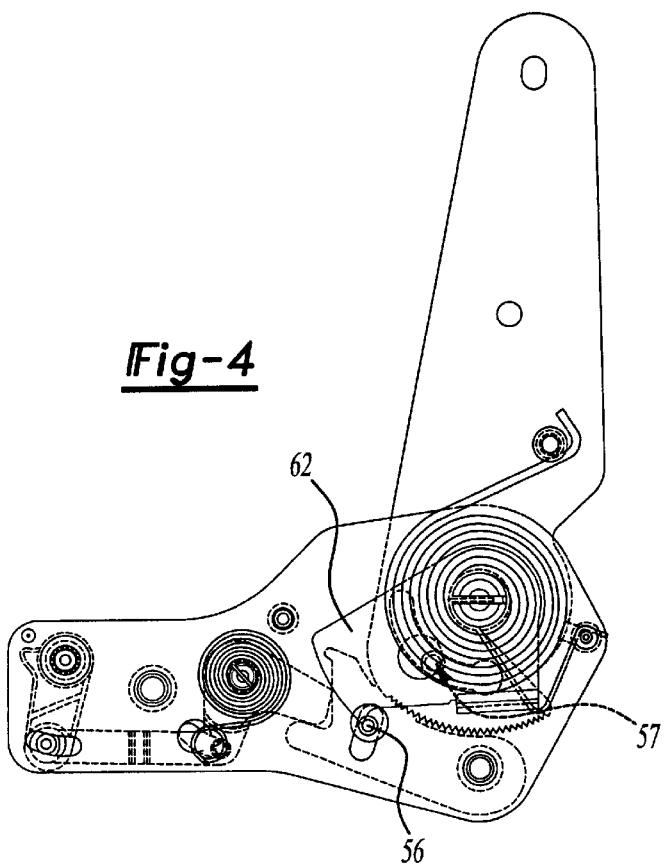
FIG. 4 is a left-side plan view of the seat hinge assembly shown in FIG. 1 with the upper hinge member forward of the full forward position shown in FIG. 3.
Figures 6, 7:
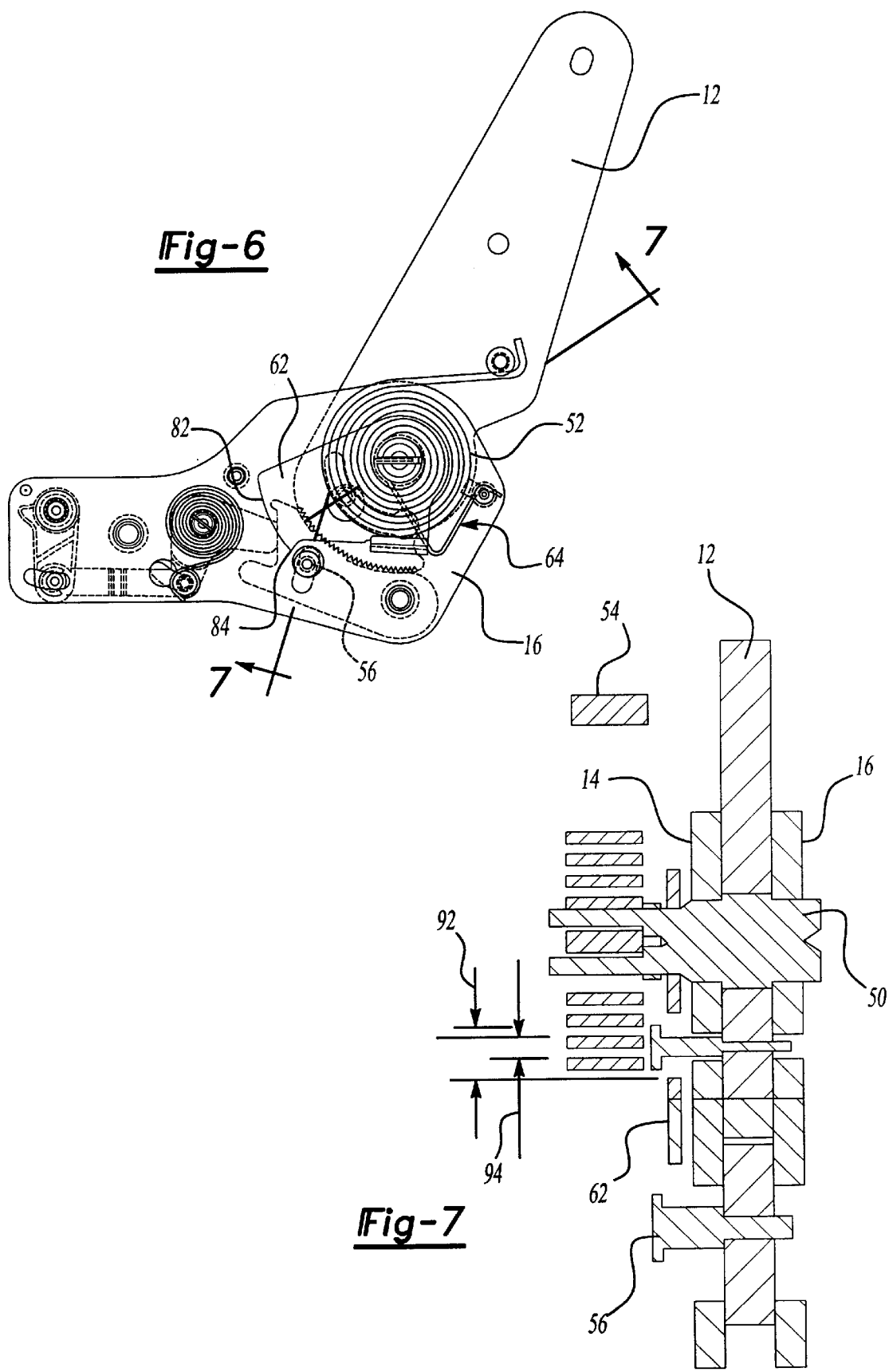
FIG. 6 is a left-side elevation view of the seat hinge assembly shown in FIG. 1 with the upper hinge member in its predetermined design position.
FIG. 7 is a cross-section view taken along the line 7—7 shown in FIG. 6.

Seat hinge assembly 10 further includes a latching mechanism 28 for selectively establishing the angular position of the upper hinge member relative to the lower hinge member and a memory mechanism 29 (FIG. 1) that is operatively associated with latching mechanism 28 to lock the upper hinge member in a predetermined design position upon return of the seatback from its forward dumped position. More particularly, the latching mechanism 28 is operable in a latched mode to prevent pivotable movement of the recliner plate 12 relative to the seat plates 14 and 16 and an unlatched mode wherein the recliner plate 12 is freely pivotable relative to the vehicle seat. Memory mechanism 29 maintains the latching mechanism in its unlatched mode when the recliner plate is moved forward of a full forward position as shown in FIGS. 3 and 4 and until the recliner plate 12 is reclined into a predetermined design position (FIG. 6).

The latching mechanism 28 of the seat hinge assembly 10 will now be described in detail with reference to FIGS. 1 and 2. A more complete description of similar rotary or sector type recliner mechanisms are contained in U.S. Pat. No. 5,788,330 issued Aug. 4, 1998 and entitled "Seat Hinge Mechanism With Easy Entry Memory Feature" and U.S. Pat. No. 5,749,625 issued May 12, 1998 and entitled "Seat Recliner For Reducing Chucking" each assigned to Fisher Dynamics Corporation, the disclosures of which are hereby incorporated by reference.

Latching mechanism 28 includes a pawl 40 pivotably coupled to the lower hinge member 13 and a release assembly 41 for pivoting pawl 40. The release assembly 41 includes a release spindle 30 pivotably coupled to the inner and outer seat plates 14 and 16 and connected to a cam 32 via a linkage 34. Cam 32 is pivotably coupled to the inner and outer seat plates and includes a cam leg 36 engageable with a thrust surface 38 of the locking pawl 40 that, in turn, is also pivotably coupled to the inner and outer seat plates such as via one of spacer barrels 24. As shown, locking pawl 40 includes a toothed segment 42 that is engageable with a toothed quadrant 44 on a lower end of upper hinge member 12 when the latching mechanism is in its latched mode. A coil spring 48 is coupled to cam 32 to bias cam 32 in a counterclockwise direction indicated by arrow 49 thereby urging the toothed pawl 40 into engagement with quadrant 44.

The latching mechanism is movable from its latched mode described above into its unlatched mode against the biasing force of coil spring 48 through rotation of release spindle 30. More particularly, a recliner actuator mechanism 47 is schematically illustrated in FIG. 3 and provided for rotating release spindle 30 when the occupant desires to adjust the reclined position of seatback 18. Those skilled in the art will appreciate that a variety of assemblies known in the art may be used to selectively move spindle 30. Upon such movement, release spindle 30 causes cam 36 to rotate clockwise, opposite arrow 49, whereupon leg 36 displaces pawl 40 from its engaged position to a released position. Manipulation of the latching mechanism allows adjustment of the angular position of the upper hinge member relative to the seat plates 14 and 16 within a predetermined adjustment range defined by a full forward position illustrated in FIG. 3 and a fully reclined position wherein the entirety of toothed segment 42 of locking pawl 40 is in locking engagement with the rear most teeth on tooth quadrant 44 of recliner plate 12.

As indicated above, memory mechanism 29 is operable in a non-actuated mode wherein the latching mechanism is freely operable between its latched and unlatched modes and an actuated mode wherein the memory mechanism maintains the latching mechanism in its unlatched mode until the upper hinge member is returned to a predetermined design reclined position following movement of the upper hinge member forward of the predetermined adjustment range. Memory mechanism 29 includes a memory plate 62, a blocking pin 56, and an actuating assembly 57. Blocking pin 56 is fixed to locking pawl 40 and disposed within a blocking slot 60 in outer seat plate 16. As locking pawl 40 is rotated in the clockwise direction toward its engaged position as indicated by arrow 58, blocking pin 56 moves upward within blocking slot 60 and into a first position when latching mechanism 28 is in its latched mode. Conversely, blocking pin 56 moves downward within blocking slot 60 upon counterclockwise rotation of locking pawl 40 toward its released position until pin 56 reaches a second position within slot 60 when latching mechanism 28 is in its unlatched mode.

Figure 5:
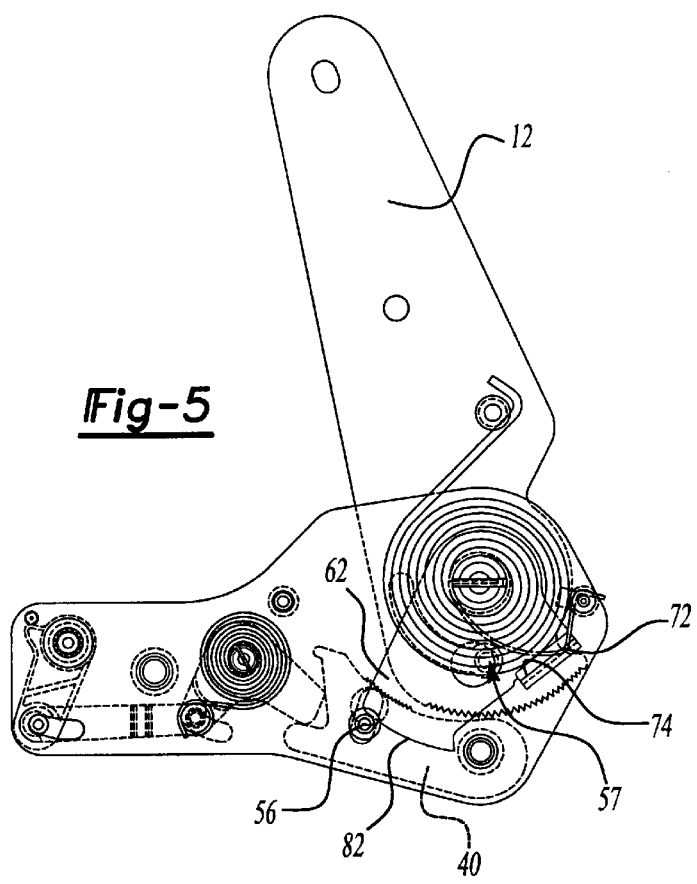
FIG. 5 is a left-side elevation view of the seat hinge assembly shown in FIG. 1 with the upper hinge member in its dump position.

Memory plate 62 is coupled to lower hinge member 13 by a pivot pin 50 for pivotable movement between a retracted position (FIGS. 1, 3, and 6) and a blocking position (FIG. 5). Memory plate 62 includes a blocking face 82 that, as shown in FIG. 5, maintains blocking pin 56 in its second position in the downward portion of blocking slot 60 when the memory plate 62 is in its blocking position, corresponding to the actuated mode of memory mechanism 29. Thus, memory plate 62 retains pawl 40 in its released position and prevents the latching mechanism from moving to its latched mode. As noted above, when memory plate 62 is in its retracted position, blocking pin 56 is freely movable within blocking slot 60 and latching mechanism 28 is freely movable between its latched and unlatched modes to allow selective adjustment of the angular position of the recliner plate 12 relative to the seat bottom.

Memory mechanism 29 further includes a spring 64 having a first leg 66 coupled to pivot pin 50 and a second leg 68 coupled to lower hinge member 13 such as by a clip 70. The first and second legs of spring 64 are sized such that the spring does not exert any force on the memory plate 62 when the plate is in its retracted position (FIGS. 1, 3, and 6). However, as best illustrated in FIG. 5, when plate 62 is rotated toward its blocking position, bend 72 of the spring 64 engages and rides in a channel 74 formed in the memory plate 62. The first and second spring legs 66 and 68 are deformed due to the channel/bend engagement thereby creating a biasing force that acts to urge the memory plate toward its retracted position.

Actuating assembly 57 operates to move memory plate 62 between its retracted and blocking positions. Actuating assembly 57 includes an actuating pin 76 fixed to upper hinge member 12, a cam slot 78 in outer seat plate 16, and an oversized pin opening 80 in memory plate 62. Memory plate 62 is positioned on the outer plate 16 such that actuating pin 76 is disposed in cam slot 78 and extends into opening 80. The blocking face 82, actuating pin 76, and pin opening 80 are sized such that actuating pin 76 moves memory plate 62 into its blocking position when the upper hinge member 12 is pivoted forward of its actuating position (FIG. 4) into its forward dumped position (FIG. 5) and into its retracted position when the upper hinge member is returned from the position forward of its actuating position to its predetermined design position (FIG. 6).

More particularly, cam slot 78 defines a first end 84 that is engageable by actuating pin 76 to prohibit undesirable movement of upper hinge member 12 past its fully reclined position and a second end 86 that is contacted by pin 76 when the upper hinge member is in its dumped position (FIG. 5.). Pin opening 80 includes a rearward side 88 that is contacted by pin 76 when upper hinge member 12 is pivoted toward its dumped position and a forward side 90 contacted by pin 76 during reclining of upper hinge member 12. When pin 76 contacts the rearward and forward sides 88 and 90 during forward and reclining movement, respectively, of the upper hinge member 12, further movement of member 12 in the identified direction causes pin 76 to displace memory plate 62 toward its blocking and retracted positions, respectively.

Pin opening 80 is oversized relative to pin 76 to allow initial motion of actuating pin 76 opposite the most recent direction of displacement to be "lost" within opening 80. For example, when the upper hinge member is reclined from its dumped position shown in FIG. 5, actuating pin 76 moves within slot 78 and from contacting engagement with rearward side 88 of opening 80 to contacting forward side 90 thereof without displacing blocking plate 62. The angular displacement of the upper hinge member 12 during this lost motion corresponds to the angular distance between the actuating position (FIG. 4) and the predetermined design position (FIG. 6) of upper hinge member 12. In the preferred embodiment of the present invention, the enlarged size of pin opening diameter 92 (FIG. 7) relative to diameter 94 of actuating pin 76 results in an angular displacement between the actuating and predetermined design positions of upper hinge member 12 of approximately twenty degrees (20°).

The above described latching mechanism, memory mechanism, and actuating mechanism cooperate to provide a reliable and cost effective seat hinge assembly having a single position memory feature that fixes the upper hinge member in a predetermined design position relative to the lower hinge member when the upper hinge member is returned from its forward dumped position.

The operation of seat hinge assembly 10 will now be described in greater detail with reference to FIGS. 3–6. FIG. 3 illustrates the locking pawl 40 in its full engaged position, the memory plate 62 in its retracted position, and the upper hinge member 12 in a full forward position within the predetermined adjustment range. FIG. 4 illustrates the initial placement of memory plate 62 into its blocking position and into engagement with blocking pin 56 upon displacement of the upper hinge member 12 into an actuating position forward of the full forward position illustrated in FIG. 3. FIG. 5 illustrates the upper hinge member 12 in its forward dumped position and the memory plate 62 in its blocking position. Memory plate 62 maintains blocking pin 56 in its second position, and therefore pawl 40 in its fully retracted position, until the upper hinge member 12 is reclined to its predetermined design position shown in FIG. 6.

As noted above, the memory mechanism is moved from its non-actuated mode to its actuated mode when the upper hinge member 12 is pivoted forward of its predetermined adjustment range. More particularly, when the latching mechanism is moved from its latched mode illustrated in FIG. 3 to its unlatched mode as shown in FIGS. 4 and 5, the upper hinge member is urged to pivot forward under the biasing force of spring 52. When the upper hinge member is pivoted into an actuating position forward of its full forward position (FIG. 4), actuating pin 76 rotationally displaces the memory plate 62 into its blocking position whereupon blocking face 82 operatively engages blocking pin 56 to prevent latching mechanism 28 from moving into its latched mode.

Figure 2:
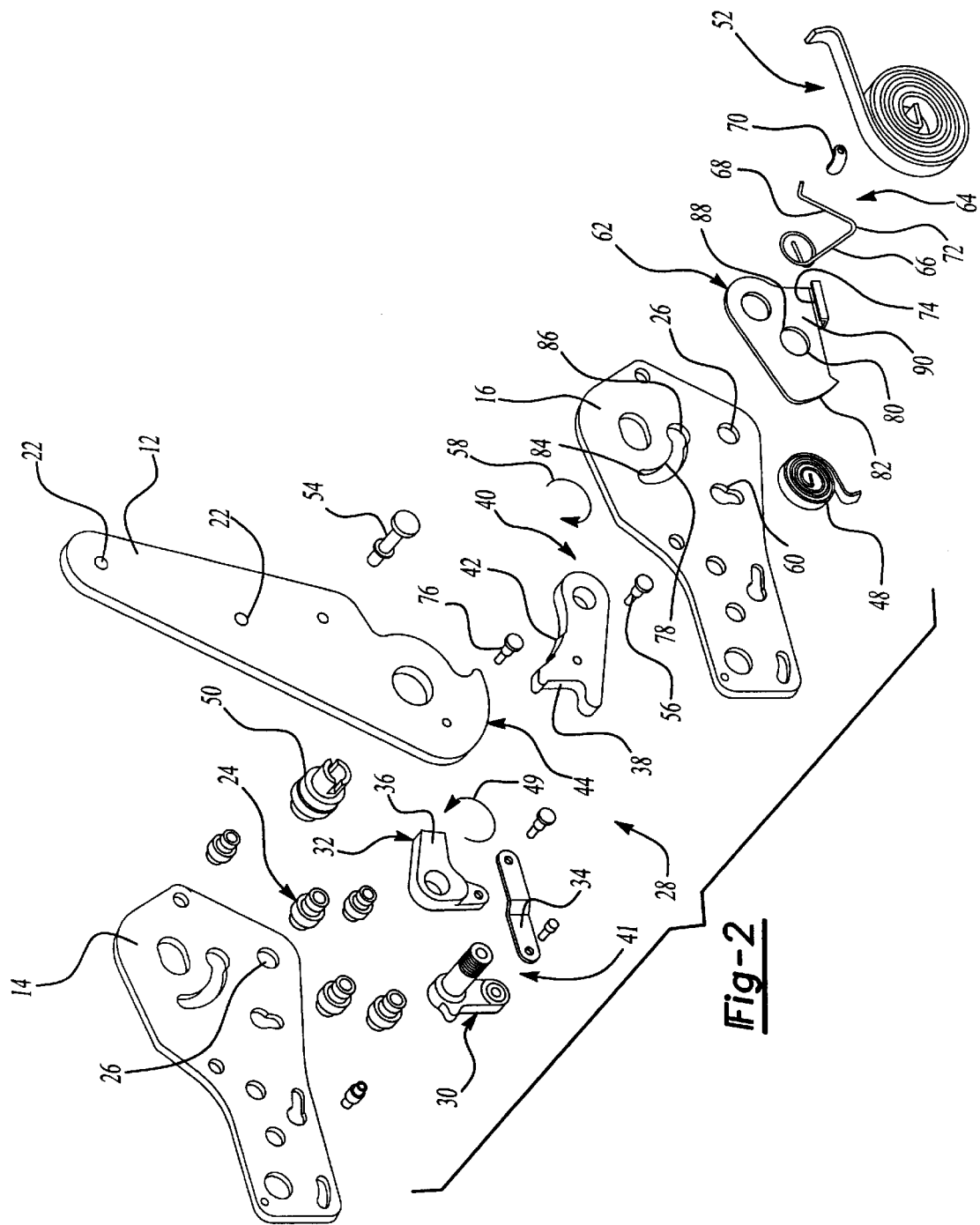
FIG. 2 is an exploded perspective view of the seat hinge assembly shown in FIG. 1.

When the upper hinge member is pivoted rearwardly from its forward dumped position (FIG. 5) toward the predetermined design position (FIG. 6), actuating pin 76 moves within cam slot 78 and pin opening 80 from rearward side 88 of oversized pin opening 80 (FIGS. 2 and 5) toward forward side 90 (FIGS. 2 and 6). Continued movement of actuating pin 76 within cam slot 78 toward first end 84 thereof causes actuating pin 76 to engage forward side 90 of pin opening 80 and displace memory plate 62 in a counter-clockwise direction causing blocking face 82 to slide relative to blocking pin 56 until end point 96 of blocking face 82 passes blocking pin 56. At this point the blocking pin is free to move upwardly within blocking slot 60 under the urging of cam 32 and coil spring 48. Thus, after blocking face 82 passes blocking pin 56, the coil spring 48 and cam 32 urge the locking pawl 40 into its engaged position thereby locking the angular position of the recliner plate 12 relative to the seat plates 14 and 16 in the predetermined design position shown in FIG. 6.

It should be appreciated that the relative angular positions of the seatback and the seat bottom in the full forward position (FIG. 3), the memory actuating position (FIG. 4), the forward dumped position (FIG. 5), and the predetermined design position (FIG. 6) may be varied, such as, for example, by changing the length of blocking face 82 or the size of pin opening 80, without departing from the scope of the invention as defined by the appended claims. In the preferred embodiment of the single position memory disclosed and claimed herein, the design position shown in FIG. 6 is approximately sixteen (16) degrees reclined from the full forward position shown in FIG. 3 and the memory actuating position shown in FIG. 4 is approximately twenty (20) degrees forward of the predetermined design position.

The above described preferred embodiment of the present invention provides a single position memory feature that consistently places the seatback into its predetermined design position upon returning the seatback to the predetermined adjustment range from the dump position. The invention provides numerous advantages over the prior art particularly related to ease of construction, reliability of performance, and cost advantages. Thus, the present invention accords a simple and cost effective memory dump mechanism for placing a seatback of a vehicle seat in a predetermined design position that is reclined relative to the seat bottom at a greater angle than the full forward position and that is independent of the position of the seatback prior to moving the seatback forward of the full forward position.

The foregoing discussion discloses and describes an exemplary embodiment of the present invention. One skilled in the art will readily recognize from such discussion and from the accompanying drawings and claims, that various changes, modifications and variations can be made therein without departing from the true spirit and fair scope of the invention as defined by the following claims.

What is claimed is:

1. A seat hinge assembly for use with a seat having a seatback supported for pivotal movement about a pivot relative to a seat bottom, comprising:

a lower hinge member adapted to be secured to the seat bottom;

an upper hinge member adapted to be fixed to the seatback, said upper hinge member being pivotably coupled to said lower hinge member about said pivot for pivotal movement relative thereto between a forward dumped position and a fully reclined position;

a latching mechanism operable in a latched mode for securing said upper hinge member in a fixed position relative to said lower hinge member for retaining the seatback in a reclined position within an adjustment range, said latching mechanism being further operable in an unlatched mode for releasing said upper hinge member for movement relative to said lower hinge member; and a memory mechanism operable in a non-actuated mode for permitting independent actuation of said latching mechanism and in an actuated mode for maintaining said latching mechanism in said unlatched mode, said memory mechanism including a blocker coupled to said lower hinge member for movement between a blocking position and a retracted position, and an actuator coupled to said upper hinge member at a location spaced from said pivot so as to move with the pivotal movement of said upper hinge member and operatively engaged with said blocker to move said blocker into said blocking position when said upper hinge member is pivoted into a memory actuating position forward of said adjustment range and to move said blocker into said retracted position upon movement of said upper hinge member from said memory actuating position to a predetermined design position.

2. The seat hinge assembly of claim 1 wherein said memory mechanism includes a blocking pin coupled for movement with said latching mechanism, said blocking pin moved from a first position when said latching mechanism is in said latched mode to a second position when said latching mechanism is in said unlatched mode, said blocker contacting said blocking pin when said blocker is in said blocking position to maintain said blocking pin in said second position and said latching mechanism in said unlocked mode.

3. The seat hinge assembly of claim 2 wherein said latching mechanism includes a pawl movable between an engaged position when said latching mechanism is in said latched mode and a retracted position when said latching mechanism is in said unlatched mode, said pawl engageable with said upper hinge member to secure said upper hinge member in a fixed position relative to said lower hinge member when said pawl is in said engaged position, and wherein said blocking pin is fixed to said pawl to move between said first position when said pawl is in said latched position and said second position when said pawl is in said unlatched position.

4. The seat hinge assembly of claim 2 wherein said blocker includes a blocking face that engages said blocking pin when said blocker is in said blocking position to prevent said blocking pin from moving from said second position to said first position.

5. The seat hinge assembly of claim 4 wherein said blocking pin is disposed within a blocking slot in said lower hinge member, said blocking pin being movable within said blocking slot between said first position and said second position.

6. The seat hinge assembly of claim 1 wherein said blocker includes a pin opening having a first side and a second side, said actuator including an actuating pin disposed in said pin opening to engage said blocker at said first side of said pin opening and move said blocker toward said retracted position when said upper hinge member is moved toward said fully reclined position and to engage said blocker at said second side of said pin opening and move said blocker toward said blocking position when said upper hinge member is moved toward said forward dumped position.

7. The seat hinge assembly of claim 6 wherein said pin opening is larger than said pin, said pin being movable between said first and second sides of said pin opening, said blocker remaining motionless relative to said lower hinge member when said pin is moving between said first and second sides of said pin opening.

8. The seat hinge assembly of claim 7 wherein said lower hinge member includes first hinge plate and a second hinge plate, said upper hinge member coupled to said lower hinge member between said first and second hinge plates, said first hinge plate including a cam slot, said blocker coupled to said first hinge plate opposite said upper hinge member, said actuating pin passing through said cam slot.

9. A seat assembly comprising:

a seat bottom;

a seatback; and a seat hinge assembly having a lower hinge member secured to the seat bottom, an upper hinge member fixed to the seat back, said upper hinge member being pivotably coupled to said lower hinge member about a pivot for pivotal movement relative thereto between a forward dumped position and a fully reclined position, said seat hinge assembly further including a latching mechanism operable in a latched mode for securing said upper hinge member in a fixed position relative to said lower hinge member for retaining the seatback in a reclined position within an adjustment range, said latching mechanism being further operable in an unlatched mode for releasing said upper hinge member for movement relative to said lower hinge member; the seat hinge assembly also including a memory mechanism operable in a non-actuated mode for permitting independent actuation of said latching mechanism and in an actuated mode for maintaining said latching mechanism in said unlatched mode, said memory mechanism including a blocker coupled to said lower hinge member for movement between a blocking position and a retracted position, and an actuator coupled to said upper hinge member at a location spaced from said pivot so as to move with the pivotal movement of said upper hinge member and operatively engaged with said blocker to move said blocker into said blocking position when said upper hinge member is moved into a memory actuating position forward of said adjustment range and to move said blocker into said retracted position upon movement of said upper hinge member from said memory actuating position to a predetermined design position.

10. The seat assembly of claim 9 wherein said memory mechanism includes a blocking pin coupled for movement with said latching mechanism, said blocking pin moved from a first position when said latching mechanism is in said latched mode to a second position when said latching mechanism is in said unlatched mode, said blocker contacting said blocking pin when said blocker is in said blocking position to maintain said blocking pin in said second position and said latching mechanism in said unlocked mode.

11. The seat assembly of claim 10 wherein said latching mechanism includes a pawl movable between an engaged position when said latching mechanism is in said latched mode and a retracted position when said latching mechanism is in said unlatched mode, said pawl engageable with said upper hinge member to secure said upper hinge member in a fixed position relative to said lower hinge member when said pawl is in said engaged position, and wherein said blocking pin is fixed to said pawl to move between said first position when said pawl is in said latched position and said second position when said pawl is in said unlatched position.

12. The seat assembly of claim 10 wherein said blocker includes a blocking face that engages said blocking pin when said blocker is in said blocking position to prevent said blocking pin from moving from said second position to said first position.

13. The seat assembly of claim 12 wherein said blocking pin is disposed within a blocking slot in said lower hinge member, said blocking pin being movable within said blocking slot between said first position and said second position.

14. The seat assembly of claim 9 wherein said blocker includes a pin opening having a first side and a second side, said actuator including an actuating pin disposed in said pin opening to engage said blocker at said first side of said pin opening and move said blocker toward said retracted position when said upper hinge member is moved toward said fully reclined position and to engage said blocker at said second side of said pin opening and move said blocker toward said blocking position when said upper hinge member is moved toward said forward dumped position.

15. The seat assembly of claim 14 wherein said pin opening is larger than said pin, said pin being movable between said first and second sides of said pin opening, said blocker remaining motionless relative to said lower hinge member when said pin is moving between said first and second sides of said pin opening.

16. The seat assembly of claim 15 wherein said lower hinge member includes a first hinge plate and a second hinge plate, said upper hinge member coupled to said lower hinge member between said first and second hinge plates, said first hinge plate including a cam slot, said blocker coupled to said first hinge plate opposite said upper hinge member, said actuating pin passing through said cam slot.

17. A seat hinge assembly for use with a seat having a seatback supported for pivotal movement relative to a seat bottom, comprising:

a lower hinge member adapted to be secured to the seat bottom;

an upper hinge member adapted to be fixed to the seatback, said upper hinge member being coupled to said lower hinge member for pivotal movement relative thereto between a forward dumped position and a fully reclined position;

a latching mechanism operable in a latched mode for securing said upper hinge member in a fixed position relative to said lower hinge member for retaining the seatback in a reclined position within an adjustment range, said latching mechanism being further operable in an unlatched mode for releasing said upper hinge member for movement relative to said lower hinge member;

a memory mechanism operable in a non-actuated mode for permitting independent actuation of said latching mechanism and in an actuated mode for maintaining said latching mechanism in said unlatched mode, said memory mechanism including a blocker coupled to said lower hinge member for movement between a blocking position and a retracted position, an actuator coupled to move with said upper hinge member and operatively engage said blocker to move said blocker into said blocking position when said upper hinge member is moved into a memory actuating position forward of said adjustment range and to move said blocker into said retracted position upon movement of said upper hinge member from said memory actuating position to a predetermined design position;

wherein said blocker includes a pin opening having a first side and a second side, said actuator including an actuating pin disposed in said pin opening to engage said blocker at said first side of said pin opening and move said blocker toward said retracted position when said upper hinge member is moved toward said fully reclined position and to engage said blocker at said second side of said pin opening and move said blocker toward said blocking position when said upper hinge member is moved toward said forward dumped position; and wherein said memory mechanism includes a blocking pin coupled for movement with said latching mechanism, said blocking pin moved from a first position when said latching mechanism is in said latched mode to a second position when said latching mechanism is in said unlatched mode; and said blocker contacting said blocking pin when said blocker is in said blocking position to maintain said blocking pin in said second position and said latching mechanism in said unlocked mode.

18. The seat hinge assembly of claim 17 wherein said latching mechanism includes a pawl movable between an engaged position when said latching mechanism is in said latched mode and a retracted position when said latching mechanism is in said unlatched mode, said pawl engageable with said upper hinge member to secure said upper hinge member in a fixed position relative to said lower hinge member when said pawl is in said engaged position, and wherein said blocking pin is fixed to said pawl to move between said first position when said pawl is in said latched position and said second position when said pawl is in said unlatched position.

19. The seat hinge assembly of claim 17 wherein said blocker includes a blocking face that engages said blocking pin when said blocker is in said blocking position to prevent said blocking pin from moving from said second position to said first position.

20. The seat hinge assembly of claim 19 wherein said blocking pin is disposed within a blocking slot in said lower hinge member, said blocking pin being movable within said blocking slot between said first position and said second position.

21. A seat assembly comprising:

a seat bottom;

a seatback;

a seat hinge assembly having a lower hinge member secured to the seat bottom, an upper hinge member fixed to the seat back, said upper hinge member being coupled to said lower hinge member for pivotal movement relative thereto between a forward dumped position and a fully reclined position, said seat hinge assembly further including a latching mechanism operable in a latched mode for securing said upper hinge member in a fixed position relative to said lower hinge member for retaining the seatback in a reclined position within an adjustment range, said latching mechanism being further operable in an unlatched mode for releasing said upper hinge member for movement relative to said lower hinge member, and the seat hinge assembly also including a memory mechanism operable in a non-actuated mode for permitting independent actuation of said latching mechanism and in an actuated mode for maintaining said latching mechanism in said unlatched mode, said memory mechanism including a blocker coupled to said lower hinge member for movement between a blocking position and a retracted position, an actuator coupled to move with said upper hinge member and operatively engage said blocker to move said blocker into said blocking position when said upper hinge member is moved into a memory actuating position forward of said adjustment range and to move said blocker into said retracted position upon movement of said upper hinge member from said memory actuating position to a predetermined design position;

wherein said blocker includes a pin opening having a first side and a second side, said actuator including an actuating pin disposed in said pin opening to engage said blocker at said first side of said pin opening and move said blocker toward said retracted position when said upper hinge member is moved toward said fully reclined position and to engage said blocker at said second side of said pin opening and move said blocker toward said blocking position when said upper hinge member is moved toward said forward dumped position; and wherein said memory mechanism includes a blocking pin coupled for movement with said latching mechanism, said blocking pin moved from a first position when said latching mechanism is in said latched mode to a second position when said latching mechanism is in said unlatched mode, said blocker contacting said blocking pin when said blocker is in said blocking position to maintain said blocking pin in said second position and said latching mechanism in said unlocked mode.

22. The seat assembly of claim 21 wherein said latching mechanism includes a pawl movable between an engaged position when said latching mechanism is in said latched mode and a retracted position when said latching mechanism is in said unlatched mode, said pawl engageable with said upper hinge member to secure said upper hinge member in a fixed position relative to said lower hinge member when said pawl is in said engaged position, and wherein said blocking pin is fixed to said pawl to move between said first position when said pawl is in said latched position and said second position when said pawl is in said unlatched position.

23. The seat assembly of claim 21 wherein said blocker includes a blocking face that engages said blocking pin when said blocker is in said blocking position to prevent said blocking pin from moving from said second position to said first position.

24. The seat assembly of claim 23 wherein said blocking pin is disposed within a blocking slot in said lower hinge member, said blocking pin being movable within said blocking slot between said first position and said second position.

* * * * *